(12) United States Patent
Yen et al.

(10) Patent No.: US 10,947,400 B2
(45) Date of Patent: Mar. 16, 2021

(54) INKJET INKS

(71) Applicant: Hewlett-Packard Development Company, L.P., Fort Collins, CO (US)

(72) Inventors: Max Yen, San Diego, CA (US); Or Brandstein, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 331 days.

(21) Appl. No.: 16/069,087

(22) PCT Filed: Mar. 29, 2016

(86) PCT No.: PCT/US2016/024672
§ 371 (c)(1),
(2) Date: Jul. 10, 2018

(87) PCT Pub. No.: WO2017/171728
PCT Pub. Date: Oct. 5, 2017

(65) Prior Publication Data
US 2019/0023923 A1    Jan. 24, 2019

(51) Int. Cl.
*C09D 11/322* (2014.01)
*C09D 11/102* (2014.01)
*C09D 11/12* (2006.01)
*C09D 11/38* (2014.01)
(Continued)

(52) U.S. Cl.
CPC ............ *C09D 11/322* (2013.01); *C09D 11/03* (2013.01); *C09D 11/102* (2013.01); *C09D 11/106* (2013.01); *C09D 11/12* (2013.01); *C09D 11/38* (2013.01)

(58) Field of Classification Search
None
See application file for complete search history.

(56) References Cited

U.S. PATENT DOCUMENTS

| 3,865,606 A | 2/1975 | Neier et al. |
| 5,889,083 A * | 3/1999 | Zhu .................. C09D 11/30 523/161 |
| 9,090,748 B2 | 7/2015 | Iwata et al. |

(Continued)

FOREIGN PATENT DOCUMENTS

| CN | 103005794 | 4/2013 |
| CN | 105295162 | 2/2016 |

(Continued)

OTHER PUBLICATIONS

English translation of CN 105295162, Feb. 2016; 6 pages.*

(Continued)

*Primary Examiner* — Helene Klemanski
(74) *Attorney, Agent, or Firm* — Thorpe North & Western LLP

(57) ABSTRACT

An inkjet ink can include an ink vehicle and ink solids carried by the ink vehicle. The ink solids can include a pigment, 5 wt % to 40 wt % polymeric binder, and 0.3 wt % to 3 wt % wax. The wax can have a melting point of from 90° C. to 115° C. and an average particle size of from 0.1 μm to 0.5 μm. Further, the wax can include wax particles having a particle size greater than 1 μm but which are present at a quantity no greater than 0.1% of the total number of wax particles based on particle count.

20 Claims, 1 Drawing Sheet

(51) Int. Cl.
 *C09D 11/03* (2014.01)
 *C09D 11/106* (2014.01)

(56) References Cited

U.S. PATENT DOCUMENTS

| | | | |
|---|---|---|---|
| 9,133,355 B2* | 9/2015 | Brandstein | C09D 11/30 |
| 9,732,244 B2* | 8/2017 | Ingle, Jr. | C09D 11/322 |
| 2009/0071366 A1* | 3/2009 | Akers, Jr. | C09D 11/322 |
| | | | 106/31.25 |
| 2012/0040156 A1 | 2/2012 | Ohashi et al. | |
| 2012/0236070 A1* | 9/2012 | Okuda | B41J 2/01 |
| | | | 347/20 |
| 2013/0187998 A1* | 7/2013 | Ohmoto | C09D 11/38 |
| | | | 347/100 |
| 2014/0232782 A1* | 8/2014 | Mukai | B41J 2/2107 |
| | | | 347/20 |
| 2015/0079504 A1 | 3/2015 | Farrugia | |
| 2015/0225586 A1* | 8/2015 | Ingle | C09D 11/38 |
| | | | 524/104 |
| 2015/0252200 A1* | 9/2015 | Kagata | C09D 11/106 |
| | | | 523/201 |
| 2015/0361288 A1 | 12/2015 | Song et al. | |
| 2016/0319141 A1* | 11/2016 | Sugita | C09D 11/322 |
| 2016/0376455 A1* | 12/2016 | Katoh | C09D 11/54 |
| | | | 428/195.1 |
| 2017/0002216 A1* | 1/2017 | Sato | C09D 11/12 |
| 2019/0315987 A1* | 10/2019 | Rahimi | C08G 18/4825 |
| 2020/0087523 A1* | 3/2020 | Yen | C09D 175/04 |

FOREIGN PATENT DOCUMENTS

| | | |
|---|---|---|
| JP | 2010224527 | 10/2010 |
| JP | 2011105915 | 6/2011 |
| JP | 2013170198 | 9/2013 |
| JP | 2015124379 | 7/2015 |
| WO | 9507313 | 3/1995 |
| WO | WO 2014/042651 A1 * | 3/2014 |
| WO | 2015111644 | 7/2015 |

OTHER PUBLICATIONS

English translation of CN 103005794, Apr. 2013; 6 pages.*
English translation of JP 2013/170198, Sep. 2013; 18 pages.*
English translation of JP 2011/105915, Jun. 2011; 38 pages.*
English translation of JP 2010/224527, Oct. 2010; 43 pages.*
Michem Emulsion 61335 datasheet; Michelman.com/products/download/?pcode=ME61335, no date available; 2 pages.*
Michem Emulsion 48040M2 datasheet; Michelman.com/products/download/?pcode=ME48040M2, no date available; 2 pages.*
Michem Emulsion 91240G datasheet; Michelman.com/products/download/?pcode=ME91240G, no date available; 2 pages.*
Liquilube 405 datasheet; lubrizol.com/Coatings/Products/Liquilube-405, no date available; 2 pages.*
International Search Report dated Dec. 20, 2016 for PCT/US2016/024672, Applicant Hewlett-Packard Development Company, L.P.

* cited by examiner

INKJET INKS

BACKGROUND

Inkjet printing has become a popular way of recording images on various media surfaces, particularly paper and photo media substrates. In part, this is because inkjet printers have low printer noise, capability of high-speed recording, and capability of multicolor recording. Additionally, these advantages can be obtained at a relatively low price to consumers. With respect to inkjet ink chemistry, the majority of commercial inkjet inks are water-based. Thus, their constituents are generally water-soluble or water dispersible. Furthermore, inkjet inks have low viscosity to accommodate high frequency jetting. Firing chamber refill processes can also be typical in inkjet architecture. Sometimes inks having positive printing characteristics with respect to certain inkjet architectures may have less than ideal performance on the printed page, and vice versa. As such, finding specific formulations that perform well in a printer device as well as on print media can be a challenge.

DETAILED DESCRIPTION

Figure 1:
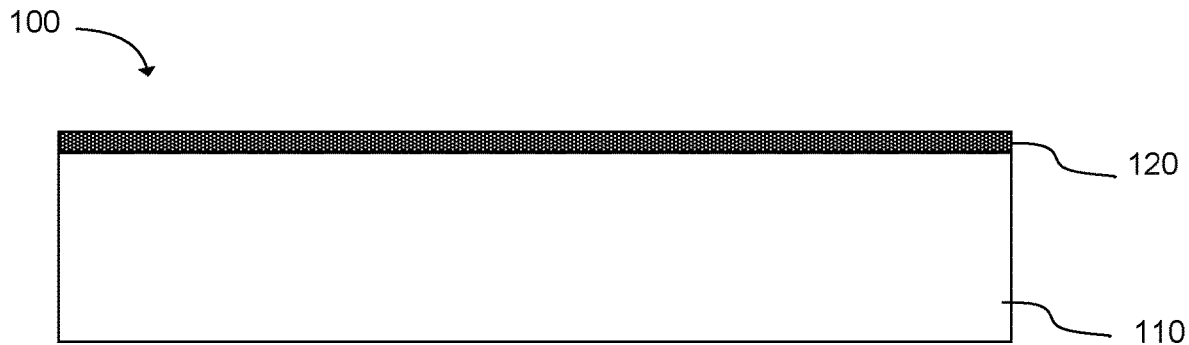
FIG. 1 is a printed article in accordance with examples of the present disclosure.

Wax emulsions can be used to provide durability to ink films, including those produced by inkjet printing. In order to be formulated into inkjet inks, wax emulsions typically include wax particles that have a sub-micron particle size and are colloidally stable in an aqueous vehicle. Further, effective use of wax particles should be such that they are able to withstand firing conditions in thermal inkjet printheads. Nonetheless, with certain types of wax, incorporating a wax emulsion into an inkjet ink typically introduces large wax particles that can be problematic for ink manufacturing, printhead clogging, and wax creaming. Thus, wax emulsions can be pre-filtered prior to incorporation into an ink to remove large particles. However, this additional filtration process can be both costly and time-consuming because filtration is difficult with certain waxes that may be otherwise desirable to use.

Accordingly, the present disclosure describes wax emulsions that can be incorporated into an ink without pre-filtration, if desired to avoid a pre-filtration step. The resulting inks can be more easily subsequently filtered, if desired, and have slower phase separation while preserving the durability benefits of wax emulsions.

In one example, an inkjet ink is described that can include an ink vehicle and ink solids carried by the ink vehicle. The ink solids can include a pigment, 5 wt % to 40 wt % polymeric binder, and 0.3 wt % to 3 wt % wax. One example of such a wax is a low density polyethylene (LDPE) wax. The wax can have a melting point of from 90° C. to 115° C. and an average particle size of from 0.1 µm to 0.5 µm. Further, the wax can include wax particles having a particle size greater than 1 µm but which are present at a quantity no greater than 0.1% of the total number of LDPE wax particles based on particle count.

In some examples, the polymeric binder can be selected from a polyurethane polymer, an acrylic polymer, or a combination thereof. In other examples, the ink vehicle can include a glycol ether solvent. In still other examples, the wax can be an LDPE wax, and/or can have a melting point from 100° C. to 110° C. In some examples, the wax can be obtained from a centrifuged wax emulsion. In other examples, the ink can have a solids content of from 30 wt % to 50 wt %. In some other examples, the inkjet ink can have from 0.5 wt % to 2 wt % wax, such as from 0.5 wt % to 2 wt % LDPE wax.

A method of preparing an inkjet ink is also described herein. The method can include preparing a wax emulsion and centrifuging the wax emulsion to selectively settle a portion of larger particles to form a gradient wax emulsion. The gradient wax emulsion can have a low-average-particle-size fraction and a high-average-particle-size fraction. The method can also include formulating an ink jet ink, which can include an ink vehicle, a pigment, a polymeric binder, and wax solids obtained from the low-average-particle-size fraction of the gradient wax emulsion to provide a wax solids content of from 0.3 wt % to 3 wt % in the inkjet ink.

In some examples, the wax emulsion can include from 30 wt % to 50 wt % wax solids. In some examples, the wax emulsion can include a wax having a melting point of from 90° C. to 115° C. In some examples, the wax solids can have an average particle size of from 0.1 µm to 0.5 µm. Further, the wax solids can include wax particles having a particle size greater than 1 µm but which are present at a quantity no greater than 0.1% of the total number of wax particles based on particle count. In some examples, centrifuging can include centrifugation of the wax emulsion at from 2000 rpm to 10000 rpm for a period of from 10 minutes to 180 minutes. In some examples, the method can also include filtering the low-average-particle-size fraction.

A printed article is also described. The printed article can include a print medium and a printed feature applied on top of the print medium with an inkjet ink as described herein.

With this in mind, the inkjet inks of the present disclosure are described herein in further detail. For example, the inkjet inks of the present disclosure can be formulated with a variety of ink vehicles. Such ink vehicles can include a mixture of a number of different agents, such as, surfactants, solvents, co-solvents, buffers, biocides, sequestering agents, viscosity modifiers, surface-active agents, water, humectants, etc.

A number of solvents and co-solvents can be used in the ink vehicle. Non-limiting examples can include organic co-solvents such as aliphatic alcohols, aromatic alcohols, diols, glycol ethers, polyglycol ethers, 2-pyrrolidinones, caprolactams, formamides, acetamides, and long chain alcohols. Further examples of such compounds can include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

In one specific example, the ink vehicle can include a glycol ether co-solvent. Glycol ether co-solvents can have the molecular formula of R'-O—$CH_2CH_2OH$, where R' is a $C_1$-$C_7$ liner, branched, or cyclic alkyl group. In some examples, a single glycol ether co-solvent can be used. In other examples, a combination of glycol ether co-solvents can be used. In one specific example, the glycol ether can include ethylene glycol monobutyl ether.

Glycol ethers and/or other co-solvents can be present in the inkjet ink composition in an amount ranging from about 0.1 wt % to about 15 wt %. In some examples, the glycol ether can be present in an amount from about 0.5 wt % to about 10 wt %. In some other examples, the glycol ether can be present in an amount from about 1 wt % to about 8 wt %.

A variety of humectants can also be used in the ink vehicle. Non-limiting examples of humectants can include polyols such as 1,2-hexanediol, 1,3-propanediol, glycerol, tri-ethylene glycol, the like, and combinations. Other humectants can also be used.

Humectants can be present in the inkjet ink composition in an amount ranging from about 0.05 wt % to about 10 wt %. In other examples, the humectant can be present in an amount ranging from about 0.1 wt % to about 8 wt %. In another example, the humectant can be present in an amount ranging from about 0.5 wt % to about 5 wt %.

In one specific example, the liquid vehicle can include a surfactant. Any suitable nonionic, cationic, or anionic surfactant can be used in the ink vehicle. In some examples, the surfactant can be a phosphate surfactant, an acetylenic surfactant, the like, or a combination thereof. In some examples, the phosphate surfactant can be a phosphate ester of fatty alcohols or fatty alcohol alkoxylates. In one embodiment, the surfactant can be a mixture of mono- and diesters, and can optionally have an acid number from 50 to 150. In another embodiment, the phosphate-containing surfactant can be of the Crodafos® family, from Croda, Inc. Specific examples include oleth-3 phosphate, oleth-10 phosphate, oleth-5 phospahte, dioleyl phosphate, ppg-5-ceteth-10 phosphate, $C_9$-$C_{15}$ alkyl monophosphate, deceth-4 phosphate, and mixtures thereof. Other specific examples by tradename include Crodafos® N3A, Crodafos® N3E, Crodafos® N10A, Crodafos® HCE, Crodafos® SG, Arlantone Map 950, Monofax 831, Monofas 1214, Monalube 215, and Atlox DP13/6.

Acetylenic surfactants can include acetylenic diols, alkoxylated acetylenic diols, and other acetylenic surfactants. Non-limiting examples can include 2,7 dimethyl-4-octyn-3,6-diol, 7-tetradecyn-6,9-diol, 2,4,7,9-tetramethyl-5-decyne-4,7-diol, 1,4-dimethyl-1,4-bis(2-methylpropyl)-2-butyne-1,4-diyl ether, the like, ethylene or propylene oxide condensates thereof, or a combination thereof. Non-limiting examples of commercially available acetylenic surfactants can include Surfynol® and Dynol™ surfactants available from Air Products.

Further, non-ionic, cationic, and/or anionic surfactants can be present in the inkjet ink composition in an amount ranging from about 0.01 wt % to about 10 wt %. In another example, the surfactant can be present in an amount ranging from about 0.05 wt % to about 5 wt %. In another example, the surfactant can be present in an amount ranging from about 0.1 wt % to about 2 wt %.

Further, the ink vehicle can carry a number of ink solids. For example and as mentioned, the ink solids can include a wax, which is typically provided to the ink vehicle as a wax emulsion. A number of wax emulsions can be prepared for use in the inkjet ink. In some examples, the wax emulsion can include any suitable wax having a melting point of from 90° C. to 115° C., from 95° C. to 110° C., or from 100° C. to 105° C. In some examples, the wax emulsion can include from 30 wt % to 50 wt % or 35 wt % to 45 wt % wax solids. In some examples, the wax can be non-ionically dispersed. In some examples, the wax particles of the wax emulsion can have a mean particle diameter (by dynamic light scattering) of from about 100 nm to about 400 nm, about 150 nm to about 300 nm, or from about 170 nm to about 280 nm. In one specific example, the wax can be a low density polyethylene (LDPE) wax. In some examples, LDPE waxes can be advantageous because they can typically have a higher melting point and a higher melt viscosity than some other waxes (e.g. polypropylene, high density polyethylene, etc.). In some examples, the wax can be a polytetrafluoroethylene (PTFE) wax. In some examples, the PTFE wax can have a melting point greater than 300° C.

Wax emulsions can have a variety of distributions of both small (i.e. particles having a size smaller than 1 μm) and large particles (i.e. particles having a size greater than 1 μm). However, nozzles in inkjet printheads are typically only about 50 μm wide, so they are susceptible to clogging due to excessive large particles in the ink. As such, inks are typically filtered prior to loading into a printhead cartridge. However, the presence of a high number of large wax particles in the ink can cause a number of filtration problems, such as clogged filters and/or slow filtration, which can delay the manufacturing process of the inks. Therefore, for wax emulsions having a high number of large particles, it can be advantageous to reduce the number of large particles in the wax emulsion prior to combining the wax emulsion with the ink vehicle.

In some examples, a pre-filtration step can be used to reduce the number of large particles in the wax emulsion prior to combining with the ink vehicle. However, particularly with certain LDPE waxes and other similar waxes, filtration can destabilize the wax emulsion, causing the resulting ink to remain somewhat difficult to further filter. This additional filtration step can lead to increased costs in disposable filters and other filtration equipment. Therefore, in other examples, the large wax particles can be removed from the wax emulsion via centrifugation.

Centrifugation can be performed as either a batch or continuous process. For example, in a batch-type centrifugation process, centrifugation can selectively settle a portion of the particles to form a gradient wax emulsion. The gradient wax emulsion can have a low-average-particle-size fraction towards the bottom and a high-average-particle-size fraction towards the top. More specifically, the low-average-particle-size fraction can have an average particle size of 0.1 μm to 0.5 μm. In some examples, the low-average-particle-size fraction can include particles that are predominantly less than 1 μm in size, while maintaining a high quantity of total wax particles. It is noted that while the low-average-particle-size fraction can still include some wax particles having a particle size greater than 1 μm, these particles are generally present at a quantity no greater than 0.1%, 0.08%, or 0.05% of the total number of wax particles based on particle count. Thus, centrifugation can reduce the number of large particles to a lower number that is sufficient to improve the filterability of the inkjet ink formulation while maintaining sufficient number of wax particles in the ink to impart increased durability to a resulting printed feature. Accordingly, a portion of the low-average-particle-size fraction of the gradient wax emulsion can be transferred to the ink vehicle to formulate an inkjet ink. Thus, it can be beneficial to remove all or part of the high-average-particle-size fraction (i.e. top portion) of the centrifuged wax emulsion prior to transferring a portion of the low-average-sized-particle fraction (i.e. bottom portion) to formulate the inkjet ink.

In other examples, a continuous centrifugation process can be used. For example, a process similar to or equivalent to continuous milk-cream separation can be used. In one non-limiting example, the wax emulsion can be introduced into a vessel or container, wherein the vessel is induced to whirl or rotate. The rapid rotation of the vessel about the wax emulsion can produce a vortex within the wax emulsion. The vortex can compel the lower density, larger wax particles toward the center of the vortex, while the higher density, smaller wax particles are compelled away from the center of the vortex toward the sidewall of the vessel. Thus, the low-average-particle-size fraction can be formed toward the periphery of the wax emulsion, proximate the sidewall of the vessel, and the high-average-particle-size fraction can be formed toward the center of the wax emulsion. As such, the low-average-particle-size fraction and the high-average-particle-size fraction can be evacuated from the vessel via separate channels or flow paths. The low-average-particle-size fraction can be collected and used to formulate an inkjet ink.

Whether the wax is centrifuged via a batch or continuous process, an inkjet ink formulated with a centrifuged wax emulsion can provide a number of advantages over inkjet inks formulated with pre-filtered wax emulsions. For example, an inkjet ink formulated with a centrifuged wax emulsion can, is some cases, provide superior durability for a printed feature as compared to an inkjet ink formulated with a pre-filtered wax emulsion. In other examples, inkjet inks formulated with a centrifuged wax emulsion can be more quickly filtered (when in the ink formulation) than an inkjet ink formulated with a pre-filtered wax emulsion. Thus, surprisingly, these centrifuged wax dispersions turned out to be compositionally different than pre-filtered wax dispersions (even if the goal of removing larger particles is the same), as evidenced by the fact that the centrifuged wax emulsions exhibited improved durability and improved ink filtration properties compared to pre-filtered wax emulsions.

As further evidence of the compositional difference between centrifuged wax emulsions compared to pre-filtered wax emulsions, in some examples, inkjet inks formulated with a centrifuged wax emulsion can have a lower creaming velocity than an inkjet ink formulated with a pre-filtered wax emulsion. More specifically, in some examples, centrifuged wax emulsions can have a harmonic mean creaming velocity of less than 3.5 µm/second(s), less than 3.4 µm/s, or less than 3.3 µm/s. In some examples, centrifuged wax emulsions can have a $90^{th}$ percentile (i.e. 90 percent of all wax particles in the emulsion) creaming velocity of less than 9 µm/s, less than 8 µm/s, or less than 7 µm/s. The decreased creaming velocity can increase the homogeneity of the wax emulsion and provide inkjet ink formulations with decreased separation or creaming of wax particles. This increased homogeneity can improve the consistency of performance of the inkjet ink over the lifetime of the ink.

The centrifugation step can be impacted to some degree by certain factors. Such factors can include the type of wax employed, the range of wax particle sizes, the duration of centrifugation, the velocity of centrifugation, and a number of other factors. For example, centrifuging the wax emulsion for a longer period of time can increase the selective settling of certain particles to the bottom of the gradient wax emulsion. In another example, increasing the centrifugation velocity can likewise increase the degree of settling of small wax particles to the bottom of the gradient wax emulsion.

However, with respect to batch-type centrifugation, prolonged centrifugation periods or excessive centrifugation velocities can reduce or eliminate the "selective" settling of wax particles and can begin to settle all particles to provide a supernatant or supernatant-like fraction that is devoid or substantially devoid of all wax particles. Therefore, when prolonged centrifugation or excessive centrifugation velocities are used, it can, in some cases, diminish or undermine the benefits of centrifugation. Alternatively, if the wax emulsion is not centrifuged long enough or at a sufficient velocity, there can be inadequate "selective" settling to provide the benefits of a centrifuged wax emulsion as described herein. Continuous centrifugation can experience similar problems. With respect to continuous centrifugation, "selective" settling can include both the settling that occurs from the top to the bottom of the wax emulsion and/or the settling or separation that occurs from the center to the periphery of the wax emulsion.

Accordingly, in some examples, centrifugation parameters can be kept within a suitable range to maintain the "selective" settling characteristics of centrifugation. For example, batch-type centrifugation can be performed at from 2000 revolutions per minute (rpm) to 8000 rpm, from 4000 rpm to 6000 rpm, from 4200 rpm to 5800 rpm, from 4500 rpm to 5500 rpm, or from 4800 rpm to 5200 rpm. Further, in some examples, batch-type centrifugation can be performed for a period of time from 10 minutes to 180 minutes, from 30 minutes to 150 minutes, from 45 minutes to 75 minutes, or from 105 minutes to 135 minutes. Continuous centrifugation can be performed at a velocity of from 2000 rpm to 10000 rpm, 2000 rpm to 4000 rpm, 4000 rpm to 6000 rpm, from 6000 rpm to 8000 rpm, or from 8000 rpm to 10,000 rpm.

It is noted that in discussing "filtration" or "filtering" herein, there are various filtering steps that should be kept in mind. When discussing "pre-filtering," what is meant is any filtering step of the wax emulsion prior to forming the ink. Once the ink is formed with the wax emulsion, a filtering step can be carried out, but this is not "pre-filtering." Thus, in one example, while centrifugation alone can increase the filterability of the ink formulation, it can still be desirable to also pre-filter the gradient wax emulsion (after centrifugation), or low-average-particle-size fraction, prior to combining it with the ink vehicle. This optional step can further increase the filterability of the inkjet ink prior to loading the ink into a printhead cartridge.

The wax can be formulated into the inkjet ink at an amount of from 0.3 wt % to 3 wt %, 0.5 wt % to 2 wt %, or from 0.7 wt % to 1.5 wt %. However, in some examples, the total solids content of the inkjet ink can range from 30 wt % to 50 wt %, 32 wt % to 48 wt %, or from 35 wt % to 45 wt %. Other ink solids that can be included in the ink can include a pigment, a polymeric binder, and any other suitable ink solid.

A "pigment" generally includes pigment colorants, magnetic particles, aluminas, silicas, and/or other ceramics, organo-metallics, metallic particulates, or other opaque particles. The pigment may or may not impart color. However, in one specific example, the pigment can be a colored pigment, including black, yellow, magenta, cyan, etc.

Specific examples of pigments can include Helliogen Blue pigment 7080 (available from BASF), Helliogen Green pigment (available from BASF), Cyan pigment (available from Toyo). The pigments can include, but are not limited to, optically variable pigments, thermochromic pigments, photochromic pigments, phosphorescent pigments, electroluminescent pigments, photoluminescent pigments, and combinations thereof. Non limiting examples of pigments are Mogul L (Cabot), Monastral Blue G (CI No. 74160), Toluidinc Red Y (CL Pigment Red 3), Quindo Magenta (Pigment Red 122), Dalamar Yellow (Pigment Yellow 74, C. I. No. 11741), Monastral Green B (CI. Pigment Green 7). In another example, the pigments are organic pigments, for example, organic black pigments. In another example, the pigments are organic or inorganic particles as well known in the art. Suitable inorganic pigments include, for example, carbon black. Other inorganic pigments may be suitable such as titanium oxide, cobalt blue ($COO-Al_2O_3$), chrome yellow (PbCrO$_4$), and iron oxide. Exemplary organic pigments include azo pigments including diazo pigments and monoazo pigments, polycyclic pigments (e.g., phthalocyanine pigments), insoluble dye chelates, nitropigments, nitroso pigments, and the like. Exemplary phthalocyanine blues include copper phthalocyanine blue and derivatives thereof (Pigment Blue 15). Examples of quinacridones include Pigment Orange 48, Pigment Orange 49, Pigment Red 122, Pigment Red 192, Pigment Red 202, Pigment Violet 19 and Pigment Violet 42. Examples of anthraquinones include Pigment Red 43, and Pigment Red 226. Examples of perylenes include Pigment Red 149 (Scarlet), Pigment Red 179, Pigment Red 190, Pigment Violet 19, and Pigment Red 224. Examples of heterocyclic yellows include Pigment Yellow 1, Pigment Yellow 3, Pigment Yellow 17, Pigment Yellow 65, Pigment Yellow 73, Pigment Yellow 74, Pigment Yellow 155, Pigment Yellow 83 and Pigment Yellow 138. Such pigments are commercially available in either powder or press cake form from a number of sources including, BASF Corporation, Engelhard Corporation and Sun Chemical Corporation. Examples of black pigments that may be used include carbon pigments. The carbon pigment is any commercially available carbon pigment that provides acceptable optical density and print characteristics. Exemplary carbon pigments include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Exemplary carbon black pigments include, without limitation, Cabot pigments such as Monarch 1400, Monarch 1100, CAB-O-JET 200, Black Pearls, and Vulcan pigments; Columbian pigments such as Raven 7000 and Raven 3500; Degussa pigments such as Color Black FW 200, Raven FW S170, Special Black 6, Special Black 5, Special Black 4, and Printex 140V; and Tipure R-available from Dupont and the like. Examples of other suitable colored pigments are described in the Colour Index, 3rd edition (The Society of Dyers and Colourists, 1982). The above list of pigments includes unmodified pigment particulates, small molecule attached pigment particulates, and polymer-dispersed pigment particulates.

Further examples of pigments include, but are not limited to, those by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, Novaperm® Yellow HR, Novaperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, Permanent Rubine F6B; pigments by Sun Chemical including L74-1357 Yellow, L75-1331 Yellow, L75-2337 Yellow; pigments by Heubach including Dalamer® Yellow YT-858-D; pigments by Ciba-Geigy including Cromophthal® Yellow 3 G, Cromophthal® Yellow GR, Cromophthal® Yellow 8 G, Irgazine® Yellow 5GT, Irgalite® Rubine 4BL, Monastral® Magenta, Monastral® Scarlet, Monastral® Violet, 15 Monastral® Red, Monastral® Violet; pigments by BASF including Lumogen® Light Yellow, Paliogen® Orange, Heliogen® Blue L 690 IF, Heliogen® Blue TBD 7010, Heliogen® Blue K 7090, Heliogen® Blue L 710 IF, Heliogen® Blue L 6470, Heliogen® Green K 8683, Heliogen® Green L 9140; pigments by Mobay including Quindo® Magenta, Indofast® Brilliant Scarlet, Quindo® Red 6700, Quindo® Red 6713, Indofast® Violet; pigments by Cabot including Maroon B Sterling® Ns Black, Sterling® NSX 76, Mogul® L; pigments by DuPont including Tlpure® R-101, and pigments by Paul Uhlich including Uhlich® BK 8200.

The pigment can be present in the composition in an amount from about 0.1 wt % to about 15 wt %. In another example, the pigment can be present in an amount from about 0.5 wt % to about 10 wt %. In yet another example, the pigment can be present in an amount from about 1 wt % to about 5 wt %.

As previously noted, the ink solids can also include a polymeric binder. In some examples, the polymeric binder can include, but is not limited to, a thermoplastic polymer. In some examples the polymer binder can be selected from olefin resins, for example, polyalkylene resins such as polyethylene resin, polypropylene resin, polybutylene resin, and polyisobutylene resin; copolymers of styrene and derivatives thereof, such as butadiene-styrene copolymer, isoprene-styrene copolymer, styrene-methacrylate copolymer, styrene-acrylate copolymer, styrene-maleic resins; vinyl resin, for example, ethylene-vinyl acetate copolymer resins, vinyl chloride-vinyl acetate copolymer resins, vinyl acetate resins, and ethylene-vinyl chloride-vinyl acetate copolymer resins; acrylic resins, for example, methacrylic acid ester resins, polyacrylic acid ester resins, ethylene-ethyl acrylate copolymer resins, and ethylene-methacrylic acid ester copolymer resins; phenol resins; polyurethane resins; polyamide resins; polyester resins; ketone resins; rosin resins; epoxy resins; alkyd resins; maleic acid resins; butyral resins; terpene resins; petroleum resins, such as aliphatic hydrocarbon resins, aromatic modified aliphatic hydrocarbon resins, and aromatic modified, cycloaliphatic hydrocarbon resins; and hydrogenated terpene resins. These polymeric binders can be employed singly or as a mixture of two or more kinds thereof.

In some examples, the polymeric binder can include polyalkylene resins, for example, polyethylene resin, polypropylene resins, polybutylene resin and polyisobutylene resin, which can be employed singly or in combination with other polyalkylene resin(s), or the other polymer binders described above, for example, a petroleum resin, such as aliphatic hydrocarbon resin, aromatic modified aliphatic hydrocarbon resin, and/or aromatic modified cycloaliphatic hydrocarbon resins.

In some examples, the polymeric binder can include a copolymer of styrene and derivatives thereof, for example, butadiene-styrene copolymer, isoprene-styrene copolymer, styrene-methacrylate copolymer and styrene-acrylate copolymer, which can be employed singly or in combination with other copolymer(s) of styrene or the other polymeric binder resins described above. In some examples, the polymeric binder can include or is a styrene-acrylate copolymer, for example, a derivatized styrene-acrylate copolymer, for example, a substituted styrene acrylate polymer, examples of which include Piloway®Ultra200 and Piloway®Ultra350 available from Eliokem®. In some examples, the styrene-copolymer, for example, styrene-acrylate copolymer, is substituted, i.e., has a substituent on the aromatic ring of the styrene moiety. In some examples, the substituent is selected from alky, alkenyl, alkynyl, alkenyl or alkoxy. The alkyl substituent(s) can be a $C_1$-$C_6$, straight or branched chain group, for example, methyl, ethyl, propyl, isopropyl, butyl, t-butyl, penty or hexyl. The alkenyl substituent(s) can be a $C_2$-$C_6$ group, for example, ethenyl (vinyl), propenyl, butenyl, pentenyl, or hexenyl. The alkynyl substituent(s) can be ethynyl, propynyl, butynyl, pentynyl or hexynyl. The alkoxy substituent(s) can be a $C_1$-$C_5$ alkoxy group, for example, methoxy, ethoxy, propoxy, butoxy, or pentoxy. In some examples, the aromatic ring of the styrene moiety is substituted with a methyl group. In some examples, the aromatic ring of the styrene moiety is substituted with a vinyl group. In some examples, the aromatic ring of the styrene moiety is substituted at more than one position, for example, two substituents, for example, three substituents. The substituent groups can be located meta, para or ortho about the aromatic ring. The substituents can be selected from any of the substituents described above. In some examples, the styrene moiety is substituted with a methyl group and a vinyl group (i.e., forming a vinyl toluene moiety).

In one specific example, the polymeric binder can include a polyurethane polymer, an acrylic polymer, or a combination thereof. In one example, the polymeric binder can include a polyurethane polymer. Non-limiting examples of polyurethane polymers can include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, the like, co-polymers thereof, or a combination thereof.

In another example, the polymeric binder can include an acrylic polymer. Non-limiting examples of acrylic polymers can include methacrylic acid ester resins, polyacrylic acid ester resins, ethylene-ethyl acrylate copolymer resins, ethylene-methacrylic acid ester copolymer resins, styrene-acrylate resins, styrene-methacrylate resins, the like, co-polymers thereof, or a combination thereof.

The polymeric binder can be present in the composition in an amount from about 0.5 wt % to about 15 wt %. In another example, the polymeric binder can be present in the composition in an amount from about 1 wt % to about 10 wt %. In another example, the polymeric binder is present in the composition in an amount from about 2 wt % to about 8 wt %.

The resulting inkjet ink composition can be used to prepare a printed article. The printed article can include any suitable print medium. Non-limiting examples can include paper, canvas, polymeric films, composite materials, the like, and combinations thereof. Accordingly, a printed feature can be applied on top of the print medium with an inkjet ink as described herein.

Turning now to the figures, FIG. 1 shows an example of a printed article 100. The printed article 100 can include any suitable print medium 110. A printed feature 120 can be applied on top of the print medium 110 with an inkjet ink as described herein. It is noted that while FIG. 1 illustrates the print medium 110 as being uncoated and unembossed, the print medium can also be a coated and/or an embossed print medium.

Figure 2:
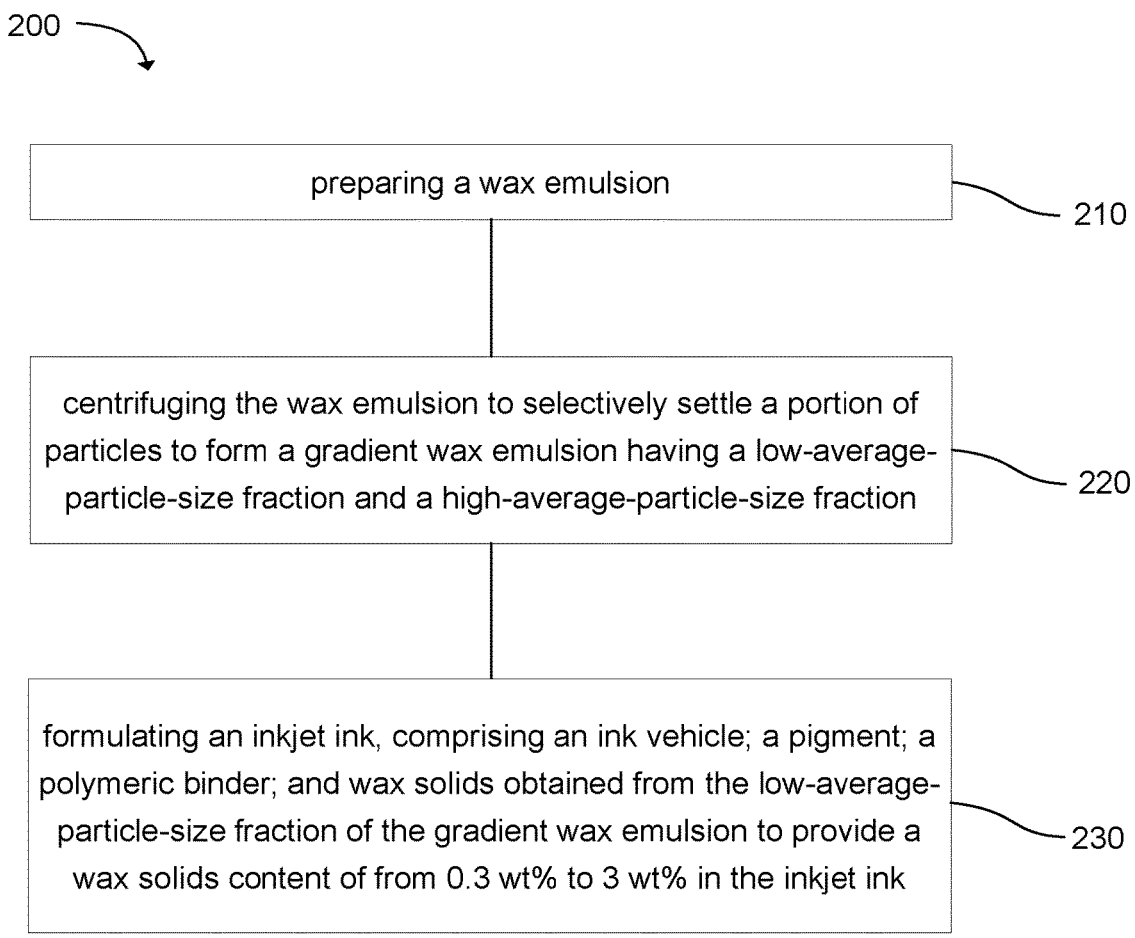
FIG. 2 is a method of preparing an inkjet ink in accordance with examples of the present disclosure.

FIG. 2 depicts method 200, which includes an example of a method of preparing an inkjet ink. Step 210 can include preparing a wax emulsion. Any suitable wax emulsion can be prepared, such as those described herein. Step 220 can include centrifuging the wax emulsion to selectively settle a portion of small particles to form a gradient wax emulsion having a low-average-particle-size fraction and a high-average-particle-size fraction. Step 230 can include formulating an ink jet ink, including an ink vehicle, a pigment, a polymeric binder, and wax solids obtained from the low-average-particle-size fraction of the gradient wax emulsion to provide a wax solids content of from 0.3 wt % to 3 wt % in the inkjet ink. A number of other methods or variations of this method can also be employed to prepare an inkjet ink.

It is noted that, as used in this specification and the appended claims, the singular forms "a," "an," and "the" include plural referents unless the content clearly dictates otherwise.

"Substrate" or "media substrate" includes any base material that can be coated in accordance with examples of the present disclosure, such as film base substrates, polymer substrates, conventional paper substrates, photobase substrates, offset media substrates, and the like. Further, precoated and film coated substrates can be considered a "substrate" that can be likewise be coated in accordance with examples of the present disclosure.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the inkjet ink, and the method of preparing, or the printed article, each of these discussions can be considered applicable to each of these examples, whether or not they are explicitly discussed in the context of that example. Thus, for example, in discussing details about the inkjet ink per se, such discussion also refers to the method and printed article, and vice versa.

The following illustrate examples of the disclosure. However, it is to be understood that these examples are merely exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements.

EXAMPLES

Example 1

Centrifugation of Wax Emulsions

A Thermo Scientific SL 16 Centrifuge was loaded with 50 mL capacity tubes filled with 40 mL of 20% diluted wax emulsion. Each sample was centrifuged at 5000 rpm for 1 or 2 hours. After centrifugation, the top 10 mL of each sample (i.e. the high-average-particle-size fraction) was removed. It is noted that once the large wax particles cream to the top of the centrifuge tube, they don't have anywhere else to go. In some cases, this can result in the wax particles fusing together under the force of the centrifuge to form a wax "cake" and other coarse agglomerates. Prior to using the centrifuged wax emulsion to formulate an inkjet ink, the wax "cake" and the top 10 mL can be removed. However, in some cases, coarse wax agglomerates can remain stuck to the walls of the centrifuge tube. Thus, the remaining wax emulsion can be poured through a mesh, such as a 300 μm mesh, to capture the course agglomerates. The material that travels through the mesh is retained for formulating the inkjet ink.

Example 2

Preparation of Inkjet Inks

The following wax emulsions were used in formulating the inkjet inks:
Emulsion diluted to 20%, Emulsion diluted to 20% and centrifuged for 1 hour (per Example 1), Emulsion diluted to 20% and centrifuged for 2 hours (per Example 1), and Emulsion diluted to 20% and filtered through a 1 μm filter.

Inkjet inks were formulated with the various wax emulsions according to Table 1 below.

TABLE 1

| Components | Amounts |
| --- | --- |
| Polyurethane | 5% active |
| Glycol ether co-solvents | 5 wt % |
| Humectant | 2 wt % |
| Phosphate surfactant | 0.50 wt % |
| Acetylenic surfactant | 0.40 wt % |
| Wax emulsion | 1 wt % active |
| Carbon black | 2.75 wt % active |

It is noted that "wt % active" refers to the targeted % solids of the specified ingredients. Once the ingredients referenced in Table 1 were combined, the resulting inkjet ink was filtered through a 1 μm polypropylene filter.

Example 3

Particle Size and Particle Count for Wax Emulsion and Inkjet Inks

Particle size and particle count data was collected for the wax emulsions alone and for the inkjet inks formulated with the various wax emulsions, as described in Example 2. Particle size was measured using a Nanotrac® particle size analyzer to determine Nano My and d95% particle sizes. Particle counts were measured using an AccuSizer® particle sizing system for particle sizes >0.5 μm and >1.0 μm. The data is illustrated in Table 2 below.

TABLE 2

| Wax Emulsion Used in Ink | Wax Emulsion | | Inkjet Ink | | Wax Emulsion | | Inkjet Ink | |
| --- | --- | --- | --- | --- | --- | --- | --- | --- |
| | Nano Mv (μm) | d95% (μm) | Nano Mv (μm) | d95% (μm) | >0.5 μm | >1.0 μm | >0.5 μm | >1.0 μm |
| No Processing | 0.266 | 0.437 | 0.147 | 0.332 | $9.1 \times 10^8$ | $7.2 \times 10^6$ | $4.8 \times 10^9$ | $2.3 \times 10^8$ |
| 1 hour Centrifugation | 0.250 | 0.396 | 0.136 | 0.252 | $4.6 \times 10^8$ | $3.7 \times 10^5$ | $2.3 \times 10^9$ | $9.6 \times 10^7$ |
| 2 hour Centrifugation | 0.234 | 0.373 | 0.140 | 0.276 | $3.3 \times 10^8$ | $1.6 \times 10^5$ | $2.5 \times 10^9$ | $5.2 \times 10^7$ |
| Pre-Filtered through 1 μm filter | 0.279 | 0.418 | 0.144 | 0.322 | $7.7 \times 10^8$ | $3.0 \times 10^6$ | $1.4 \times 10^{10}$ | $6.2 \times 10^8$ |

As can be seen in Table 2, wax emulsions that were processed via centrifugation have substantially smaller particle sizes and particle counts than unprocessed or pre-filtered wax emulsions. Further, this distinction holds true even after the wax emulsions are formulated into an ink composition.

Example 4

Filtration Study

The inks used in this study are described in Example 2. 50 ml of each of the inks were loaded into separate 60 ml Becton Dickinson syringes, which were each subsequently fitted with a 0.7 μm polypropylene microfiber syringe filter from Whatman. Each syringe was loaded onto a syringe pump configured to depress the syringe at 60 psi. The amount of ink filtered before the flow decreased to less than 0.5 mL/s was measured. If all of the ink was successfully filtered then a value of 50 ml was recorded. The results of the filtration study are depicted in Table 3 below.

TABLE 3

| Wax Emulsion Used in Ink | Amount Filtered (ml) |
| --- | --- |
| a. Emulsion diluted to 20% | 30 |
| b. Emulsion diluted to 20%, centrifuged for 1 hour | 50 |
| c. Emulsion diluted to 20%, centrifuged for 2 hours | 50 |
| d. Emulsion diluted to 20%, then filtered through a 1 μm filter | 15 |

As indicated by these results, inks made with centrifuged wax emulsions are substantially easier to filter than inks made with wax emulsions that are either diluted without filtration or diluted and filtered through a 1 μm filter. Further, as indicated by these results, the filtration process can even destabilize the wax emulsion, leading to worse filterability than an unfiltered wax emulsion.

Example 5

Durability Print Testing

The inks described in Example 2 were filled into HP printhead cartridges. These printhead cartridges were used to print a solid black pattern on RockTenn® Coated White Top (RT1) media. Afterwards, the printed features were tested for abrasion durability using a Sutherland® 2000™ rub tester from Gardco. This instrument rubs the printed feature 50 to 200 times to determine the durability of the feature. Each printed feature was graded visually using a scale from 1-5, where 5 represents no damage to the printed feature and 1 represents a printed feature that has been completely stripped off. The results of this test are illustrated in Table 4 below.

TABLE 4

| Wax Emulsion | Media | 50 Cycles | 100 Cycles | 150 Cycles | 200 Cycles |
|---|---|---|---|---|---|
| No Processing | RT1 | 5 | 5 | 5 | 5 |
| 1 hour Centrifugation | RT1 | 5 | 5 | 5 | 5 |
| 2 hour Centrifugation | RT1 | 5 | 5 | 5 | 5 |
| Pre-Filtered through 1 µm filter | RT1 | 4 | 4 | 3 | 3 |

As these results illustrate, wax emulsions can enhance the durability of a printed feature. However, the wax emulsion needs to be processed properly to allow the ink to filter well in order to provide increased durability. These results show that centrifuged wax emulsions formulated into inkjet inks do not compromise the durability-enhancing aspects of the wax emulsions as compared to the wax emulsion that is unprocessed. However, the wax emulsion that was filtered resulted in an ink formulation with inferior durability characteristics.

Example 6

Wax Creaming

The wax emulsions described in Example 2 (not formulated into inks) were diluted to 1% in water and then tested in a Lumisizer® analytical centrifuge from Lum GmbH. This analytical tool centrifuges colloid samples and users near-IR light transmission through the sample to detect colloid separation as a function of process time. The results are illustrated in Table 5 below.

TABLE 5

| Wax Emulsion | Harmonic Mean Creaming Velocity (µm/s) | 90$^{th}$ Percentile Creaming Velocity (µm/s) |
|---|---|---|
| No Processing | 3.58 | 9.53 |
| 1 hour Centrifugation | 3.41 | 8.13 |
| 2 hour Centrifugation | 3.26 | 6.59 |
| Pre-Filtered through 1 µm filter | 3.57 | 9.07 |

These results illustrate that centrifugation of wax emulsions prior to formulating them into ink compositions can reduce the creaming velocity by removing large particles that cream quickly. This can decrease the likelihood that an inkjet ink will contain a wax that has separated. Further, an ink in which the wax stays homogenously distributed can consistently offer the benefits intended by the wax emulsion. In contrast, inks with non-homogenous wax distribution can have inconsistent performance.

This technology has been described with reference to certain examples, and those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An inkjet ink, comprising:
   an ink vehicle; and
   ink solids carried by the ink vehicle, said ink solids comprising:
   a pigment;
   0.5 wt % to 15 wt % polymeric binder; and
   0.3 wt % to 3 wt % wax having a melting point of from 90° C. to 115° C., an average particle size of from 0.1 µm to 0.5 µm, and comprising wax particles having a particle size greater than 1 µm in a quantity no greater than 0.1% of the total number of wax particles, wherein the wax is obtained from a centrifuged wax emulsion.

2. The inkjet ink of claim 1, wherein the polymeric binder is selected from the group consisting of a polyurethane polymer, an acrylic polymer, and combinations thereof.

3. The inkjet ink of claim 1, wherein the ink vehicle comprises a glycol ether solvent.

4. The inkjet ink of claim 1, wherein the wax has a melting point of from 95° C. to 110° C.

5. The inkjet ink of claim 1, wherein the ink has a solids content of from 30 wt % to 50 wt %.

6. The inkjet ink of claim 1, wherein the inkjet ink has from 0.5 wt % to 2 wt % wax.

7. The inkjet ink of claim 1, wherein the wax is a low density polyethylene wax.

8. The inkjet ink of claim 1, wherein the wax emulsion comprises a low density polyethylene wax having a melting point of from 100° C. to 110° C., wherein wax solids have an average particle size of from 0.1 µm to 0.5 µm, said wax solids comprising wax particles having a particle size greater than 1 µm in a quantity no greater than 0.1% of the total number of wax particles based on particle count.

9. The inkjet ink of claim 1, wherein the wax is obtained by batch centrifugation of the wax emulsion at from 2000 rpm to 8000 rpm for a period of from 10 minutes to 180 minutes.

10. The inkjet ink of claim 1, wherein the wax is obtained by continuous centrifugation of the wax emulsion at from 2000 rpm to 10000 rpm.

11. The inkjet ink of claim 1, wherein the wax is obtained by centrifuging the wax emulsion to selectively settle particles to form a gradient wax emulsion having a low-average-particle-size fraction and a high-average-particle-size fraction, and wherein the wax is obtained by filtering the low-average-particle-size fraction.

12. A method of preparing an inkjet ink, comprising:
preparing a wax emulsion;
centrifuging the wax emulsion to selectively settle particles to form a gradient wax emulsion having a low-average-particle-size fraction and a high-average-particle-size fraction; and
formulating an inkjet ink, comprising:
an ink vehicle;
a pigment;
a polymeric binder; and
wax solids obtained from the low-average-particle-size fraction of the gradient wax emulsion to provide a wax solids content of from 0.3 wt % to 3 wt % in the inkjet ink.

13. The method of claim 12, wherein the wax emulsion comprises a low density, polyethylene wax having a melting point of from 100° C. to 110° C., wherein the wax solids have an average particle size of from 0.1 μm to 0.5 μm, said wax solids comprising wax particles having a particle size greater than 1 μm in a quantity no greater than 0.1% of the total number of wax particles based on particle count.

14. The method of claim 12, wherein centrifuging comprises batch centrifugation of the wax emulsion at from 2000 rpm to 8000 rpm for a period of from 10 minutes to 180 minutes.

15. The method of claim 12, wherein centrifuging comprises continuous centrifugation of the wax emulsion at from 2000 rpm to 10000 rpm.

16. The method of claim 12, further comprising filtering the low-average-particle-size fraction.

17. The method of claim 12, wherein:
the polymeric binder is selected from the group consisting of a polyurethane polymer, an acrylic polymer, and combinations thereof;
the ink vehicle comprises a glycol ether solvent; or
both.

18. The method of claim 12, wherein the inkjet ink has:
a solids content of from 30 wt % to 50 wt %;
from 0.5 wt % to 2 wt % wax solids; or
both.

19. The method of claim 12, wherein the wax in the wax solids:
has as a melting point of from 95° C. to 110° C.;
includes a low density polyethylene wax; or
both.

20. A printed article, comprising:
a print medium; and
a printed feature applied on top of the print medium with the inkjet ink of claim 1.

* * * * *